US012223939B2

(12) United States Patent
Wang et al.

(10) Patent No.: US 12,223,939 B2
(45) Date of Patent: Feb. 11, 2025

(54) NOISE REDUCTION METHOD AND NOISE REDUCTION APPARATUS

(71) Applicant: HONOR DEVICE CO., LTD., Guangdong (CN)

(72) Inventors: Ruchen Wang, Shenzhen (CN); Zhiheng Cai, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 40 days.

(21) Appl. No.: 18/025,671

(22) PCT Filed: Apr. 26, 2022

(86) PCT No.: PCT/CN2022/089360
§ 371 (c)(1),
(2) Date: Mar. 10, 2023

(87) PCT Pub. No.: WO2022/262432
PCT Pub. Date: Dec. 22, 2022

(65) Prior Publication Data
US 2023/0343318 A1    Oct. 26, 2023

(30) Foreign Application Priority Data

Jun. 18, 2021 (CN) .......................... 202110681419.8

(51) Int. Cl.
*G10K 11/178* (2006.01)
(52) U.S. Cl.
CPC ................ *G10K 11/1781* (2018.01)
(58) Field of Classification Search
CPC .......................... G10K 11/178; G10K 11/1781

USPC ......................................................... 381/94.1
See application file for complete search history.

(56) References Cited

U.S. PATENT DOCUMENTS

| 8,503,687 B2 * | 8/2013 | Hoshuyama | ........... H04M 9/082 |
| | | | 381/94.1 |
| 9,053,697 B2 | 6/2015 | Park et al. | |
| 11,328,705 B2 | 5/2022 | Hua et al. | |
| 2003/0198357 A1 * | 10/2003 | Schneider | ........... G10L 21/0208 |
| | | | 704/E21.009 |

(Continued)

FOREIGN PATENT DOCUMENTS

| CN | 1737905 A | 2/2006 |
| CN | 102947878 A | 2/2013 |

(Continued)

*Primary Examiner* — David L Ton

(57) ABSTRACT

A noise reduction method and a noise reduction apparatus are provided. The noise reduction method is applied to a keyboard of an integrated terminal device, and the noise reduction method includes: obtaining a first voice source and a second voice source, where the first voice source is a fidelity voice source, the second voice source is an audio signal that includes the first voice source and a noise signal, and the noise signal comes from noise generated by vibration of the keyboard, and/or the noise signal comes from noise of an environment in which the integrated terminal device is located; determining the noise signal based on the first voice source and the second voice source. Based on the technical solutions in this application, the noise signal generated by the integrated terminal device can be offset, so that noise reduction processing is implemented and user experience is improved.

15 Claims, 8 Drawing Sheets

(56) References Cited

U.S. PATENT DOCUMENTS

| | | |
|---|---|---|
| 2010/0002385 A1 | 1/2010 | Lyon et al. |
| 2016/0323666 A1 | 11/2016 | Ajmera et al. |
| 2017/0194015 A1* | 7/2017 | Buchner ................. G10L 19/26 |
| 2017/0352342 A1 | 12/2017 | Lee |
| 2018/0108341 A1 | 4/2018 | Burgess et al. |

FOREIGN PATENT DOCUMENTS

| | | | |
|---|---|---|---|
| CN | 107454248 A | 12/2017 | |
| CN | 108847208 A | 11/2018 | |
| CN | 109361995 A | 2/2019 | |
| CN | 111508513 A | 8/2020 | |
| CN | 211604080 U | 9/2020 | |
| CN | 111899754 A | 11/2020 | |
| CN | 112185410 A | 1/2021 | |
| CN | 112422862 A | 2/2021 | |
| CN | 112735462 A | 4/2021 | |
| CN | 113571035 A | 10/2021 | |
| EP | 1768109 A1 * | 3/2007 | ......... G10L 21/0208 |

* cited by examiner

NOISE REDUCTION METHOD AND NOISE REDUCTION APPARATUS

This application is a national stage of International Application No. PCT/CN2022/089360, filed on Apr. 26, 2022, which claims priority to Chinese Patent Application No. 202110681419.8, filed on Jun. 18, 2021. The disclosures of both the aforementioned applications are hereby incorporated by reference in their entireties.

TECHNICAL FIELD

This application relates to the field of electronic technologies, and in particular, to a noise reduction method and a noise reduction apparatus.

BACKGROUND

An overall structure of a personal computer (personal computer, PC) device is designed to become lighter and thinner. Therefore, a material of a keyboard of the PC device is lighter and thinner. A keyboard resonance phenomenon occurs because of a requirement for high volume of a loudspeaker, leading to a type of noise referred to as keyboard resonance noise. The keyboard resonance noise reduces user experience of using the PC device.

Therefore, how to reduce noise and perform noise reduction processing on the PC device becomes a problem that urgently needs to be resolved.

SUMMARY

This application provides a noise reduction method and a noise reduction apparatus, to perform noise reduction processing on noise generated by a keyboard of an integrated terminal device to improve user experience.

According to a first aspect, a noise reduction method is provided. The noise reduction method is applied to a keyboard of an integrated terminal device and includes:

obtaining a first voice source and a second voice source, where the first voice source is a fidelity voice source, the second voice source is an audio signal that includes the first voice source and a noise signal, and the noise signal comes from noise generated by vibration of the keyboard, and/or the noise signal comes from noise of an environment in which the integrated terminal device is located; determining the noise signal based on the first voice source and the second voice source; and performing noise reduction processing on the second voice source based on the noise signal, to obtain a voice source that undergoes the noise reduction processing.

It should be understood that the noise reduction method in this embodiment of this application may be applied to the audio field. The noise reduction processing may be using a processing method to reduce impact of noise in a voice source on a user, or the noise reduction processing may be canceling or reducing noise in an audio signal obtained by a user.

It should be further understood that the first voice source may be an audio signal output by a power amplifier by processing an obtained audio signal input by a low-pass filter.

In a possible implementation, the fidelity voice source may be an original audio signal, namely, an audio signal that does not undergo third-party effect processing.

For example, the original audio signal may be an obtained unplayed audio signal, for example, an audio signal corresponding to an unplayed video or audio file that is obtained from a server or locally stored.

In a possible implementation, the fidelity voice source may be an audio signal obtained after third-party effect processing is performed on an original audio signal. For example, if an unplayed original video or audio file that is obtained from a server or locally stored is processed into jazz style audio, rock style audio, or audio of another style by using sound effect adjustment software, an audio signal corresponding to the processed jazz style audio, rock style audio, or audio of another style is also a type of fidelity voice source.

It should be understood that, in this embodiment of this application, the fidelity voice source is an audio signal corresponding to an unplayed video or audio file that is obtained by the terminal device. The fidelity voice source may be an original voice source, or the fidelity voice source may be a voice source obtained after effect processing is performed on an original voice source.

In this embodiment of this application, a fidelity voice source (an example of the first voice source) and a voice source (an example of the second voice source) superimposed with noise are obtained, and the two voice sources are compared to extract a noise signal in the voice source superimposed with noise. The noise signal can be further offset to obtain a voice source that undergoes noise reduction processing, so that user experience can be improved.

With reference to the first aspect, in some implementations of the first aspect, the determining the noise signal based on the first voice source and the second voice source includes:

performing time-to-frequency conversion processing on the first voice source to obtain a first frequency response line graph; performing time-to-frequency conversion processing on the second voice source to obtain a second frequency response line graph; and determining the noise signal based on the first frequency response line graph and the second frequency response line graph.

It should be understood that the time-to-frequency conversion processing may be converting a time domain signal into a frequency domain signal through a Fourier transform. The time-to-frequency conversion processing may also be referred to as time-to-frequency transformation.

With reference to the first aspect, in some implementations of the first aspect, the determining the noise signal based on the first frequency response line graph and the second frequency response line graph includes:

comparing the first frequency response line graph with the second frequency response line graph within a frequency range of a human ear hearing range to determine the noise signal.

In a possible implementation, a frequency response line graph (an example of the second frequency response line graph) corresponding to the voice source superimposed with noise may be compared with a frequency response line graph (an example of the first frequency response line graph) corresponding to the fidelity voice source within the frequency range of the human ear hearing range 20 Hz to 20 kHz. The hearing range may be a frequency range that can be heard by a human ear.

In a possible implementation, the frequency response line graph (an example of the second frequency response line graph) corresponding to the voice source superimposed with noise may be compared with the frequency response line graph (an example of the first frequency response line graph) corresponding to the fidelity voice source within an effective or a high-risk frequency range 100 Hz to 1 kHz. The effective or high-risk frequency range may be a frequency range within which a human ear is sensitive to a voice source.

With reference to the first aspect, in some implementations of the first aspect, the performing noise reduction processing on the second voice source based on the noise signal includes:

performing noise reduction processing on the second voice source in a phase inverting manner based on the noise signal.

In this embodiment of this application, the fidelity voice source (the first voice source) and the voice source (the second voice source) superimposed with noise may be obtained, and the two voice sources are compared to extract a noise feature in the voice source (the second voice source) superimposed with noise. The noise feature can be further offset in the phase inverting manner, so that noise reduction processing is implemented and user experience is improved.

With reference to the first aspect, in some implementations of the first aspect, the performing noise reduction processing on the second voice source based on the noise signal includes:

performing noise reduction processing on the second voice source through filtering based on the noise signal.

In this embodiment of this application, the fidelity voice source (the first voice source) and the voice source (the second voice source) superimposed with noise may be obtained, and the two voice sources are compared to extract a noise feature in the voice source (the second voice source) superimposed with noise. Noise reduction processing may be further performed on the second voice source through filtering, so that user experience is improved.

With reference to the first aspect, in some implementations of the first aspect, the method further includes:

configuring at least one noise canceling loudspeaker below the keyboard, where the at least one noise canceling loudspeaker is configured to play a noise reduction voice source, and the noise reduction voice source is an audio signal obtained after phase inverting processing is performed on the noise signal.

With reference to the first aspect, in some implementations of the first aspect, a weight of any one of the at least one noise canceling loudspeaker is determined based on an installation position.

With reference to the first aspect, in some implementations of the first aspect, the noise signal includes a resonance signal generated by the keyboard and the loudspeaker.

According to a second aspect, a noise reduction method is provided. The noise reduction method includes:

displaying a display interface of an integrated terminal device; receiving a first operation of a user on the display interface; and responding to the first operation, so that the integrated terminal device performs the following steps:

obtaining a first voice source and a second voice source, where the first voice source is a fidelity voice source, the second voice source is an audio signal that includes the first voice source and a noise signal, and the noise signal comes from noise generated by a keyboard, and/or the noise signal comes from noise of an environment in which the integrated terminal device is located; obtaining the noise signal based on the first voice source and the second voice source; and performing noise reduction processing on the second voice source based on the noise signal, to determine a voice source that undergoes the noise reduction processing.

With reference to the second aspect, in some implementations of the second aspect, the first operation is an operation of clicking a noise reduction application.

With reference to the second aspect, in some implementations of the second aspect, the first operation is an operation of configuring the noise reduction method to be enabled once the integrated terminal device is powered on.

In a possible implementation, the fidelity voice source may be an original audio signal, namely, an audio signal that does not undergo third-party effect processing.

For example, the original audio signal may be an obtained unplayed audio signal, for example, an audio signal corresponding to an unplayed video or audio file that is obtained from a server or locally stored.

In a possible implementation, the fidelity voice source may be an audio signal obtained after third-party effect processing is performed on an original audio signal. For example, if an unplayed original video or audio file that is obtained from a server or locally stored is processed into jazz style audio, rock style audio, or audio of another style by using sound effect adjustment software, an audio signal corresponding to the processed jazz style audio, rock style audio, or audio of another style is also a type of fidelity voice source.

It should be understood that, in this embodiment of this application, the fidelity voice source is an audio signal corresponding to an unplayed video or audio file that is obtained by the terminal device. The fidelity voice source may be an original voice source, or the fidelity voice source may be a voice source obtained after effect processing is performed on an original voice source.

According to a third aspect, a noise reduction apparatus is provided. The noise reduction apparatus includes a unit configured to perform either of the methods in the first aspect and the second aspect. The noise reduction apparatus may be an integrated terminal device, or may be a chip in an integrated terminal device. The noise reduction apparatus may include an input unit and a processing unit.

When the noise reduction apparatus is an integrated terminal device, the processing unit may be a processor, and the input unit may be a communications interface. The integrated terminal device may further include a memory, the memory is configured to store computer program code, and when the processor executes the computer program code stored in the memory, the terminal device performs either of the methods in the first aspect and the second aspect.

When the noise reduction apparatus is a chip in an integrated terminal device, the processing unit may be a processing unit inside the chip, and the input unit may be an output interface, a pin, a circuit, or the like. The chip may further include a memory, and the memory may be a memory (for example, a register or a cache) inside the chip, or may be a memory (for example, a read-only memory or a random access memory) outside the chip. The memory is configured to store computer program code, and when the processor executes the computer program code stored in the memory, the chip performs either of the methods in the first aspect and the second aspect.

According to a fourth aspect, a computer readable storage medium is provided. The computer readable storage medium stores computer program code, and when the computer program code is run by a noise reduction apparatus, the noise reduction apparatus performs either of the methods in the first aspect and the second aspect.

According to a fifth aspect, a computer program product is provided. The computer program product includes computer program code, and when the computer program code is run by a noise reduction apparatus, the apparatus performs either of the methods in the first aspect and the second aspect.

DESCRIPTION OF EMBODIMENTS

With reference to the accompanying drawings of embodiments of this application, the following describes the technical solutions in embodiments of this application. In descriptions of embodiments of this application, unless otherwise noted, "I" means "or", for example, A/B may mean A or B. In this specification, "and/or" merely describes an association relationship between associated objects, and indicates that three relationships may exist. For example, A and/or B may represent the following cases: Only A exists, both A and B exist, and only B exists.

In the following descriptions, terms "first" and "second" are used only for description purposes, and cannot be understood as an indication or implication of relative importance or implicit indication of a quantity of indicated technical features. Therefore, features limited by "first" and "second" may explicitly or implicitly include one or more such features. In descriptions of embodiments, unless otherwise noted, "a plurality of" means two or more.

Figure 1:
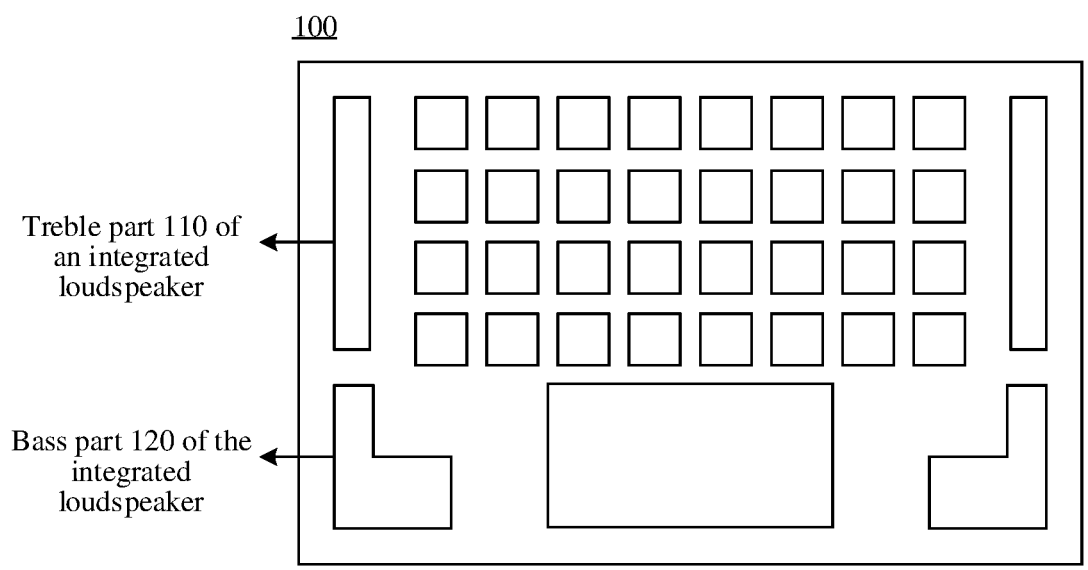
FIG. 1 is a schematic diagram of an integrated loudspeaker of a PC device according to an embodiment of this application.

First, generation of keyboard noise of a personal computer (personal computer, PC) device is described with reference to FIG. 1. PC devices generally use integrated loudspeakers because overall structures are designed to become lighter and thinner. As shown in FIG. 1, the integrated loudspeaker usually includes a treble part 110 of the integrated loudspeaker and a bass part 120 of the integrated loudspeaker. When a sound is played, the loudspeaker of the PC device generates vibration as volume increases, and the vibration causes resonance on a keyboard through conduction, to form keyboard resonance noise. The keyboard resonance noise reduces user experience of using the PC device.

In view of this, this application provides a noise reduction method. A fidelity voice source (an example of a first voice source) and a voice source (an example of a second voice source) superimposed with noise are obtained, and the two voice sources are compared to extract a noise signal in the voice source superimposed with noise. The noise signal can be further offset, so that noise reduction processing is implemented and user experience is improved.

Figure 2:
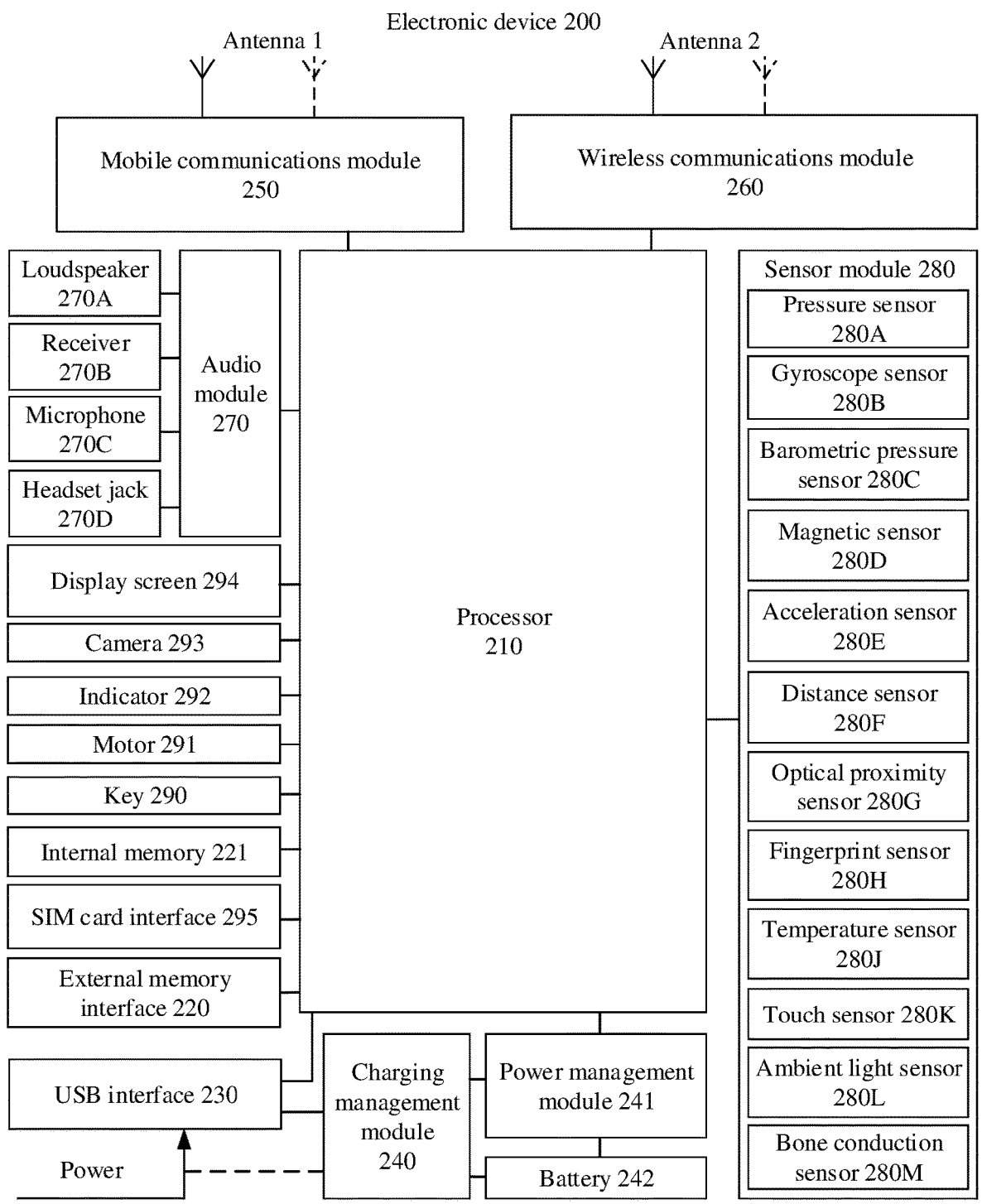
FIG. 2 is a schematic diagram of a hardware structure of an electronic device according to an embodiment of this application.

The following describes a structure of the PC device with reference to FIG. 2. An electronic device 200 shown in FIG. 2 may be a PC device. As shown in FIG. 2, the electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a loudspeaker 270A, a receiver 270B, a microphone 270C, a headset jack 270D, a sensor module 280, a key 290, a motor 291, an indicator 292, a camera 293, a display screen 294, a subscriber identity module (subscriber identification module, SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of this application does not constitute a specific limitation on the electronic device 200. In some other embodiments of this application, the electronic device 200 may include more or fewer components than those shown in the figure, or may combine some components, or may split some components, or may have different component arrangements. The components shown in the figure may be implemented by hardware, software, or a combination of software and hardware.

For example, the processor 210 shown in FIG. 2 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a neural center and a command center of the device 200. The controller may generate an operation control signal based on an instruction operation code and a timing signal, to complete instruction fetching and instruction execution control.

The memory may be further disposed in the processor 210 to store instructions and data. In some embodiments, the memory of the processor 210 is a cache memory. The memory may store an instruction or data that is just used or cyclically used by the processor 210. If the processor 210 needs to reuse the instruction or the data, the instruction or the data may be directly invoked from the memory. Repeated access is avoided, and a waiting time of the processor 210 is reduced, so that system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, and the like.

In some embodiments, the I2C interface is a bidirectional synchronous serial bus, and includes one serial data line (serial data line, SDA) and one derail clock line (derail clock line, SCL). The processor 210 may include a plurality of I2C buses. The processor 210 may be separately coupled to the touch sensor 280K, a charger, a flash, the camera 293, and the like through different I2C bus interfaces. For example, the processor 210 may be coupled to the touch sensor 280K by using the I2C interface, so that the processor 210 communicates with the touch sensor 280K through the I2C bus interface to implement a touch function of the electronic device 200.

In some embodiments, the I2S interface may be used for audio communication. The processor 210 may include a plurality of I2S buses. The processor 210 may be coupled to the audio module 270 through the I2S bus to implement communication between the processor 210 and the audio module 270.

In some embodiments, the audio module 270 may transmit an audio signal to the wireless communications module 260 through the I2S interface to implement a function of answering calls by using a Bluetooth headset.

In some embodiments, the PCM interface may also be used for audio communication to perform sampling, quantization, and coding of an analog signal. The audio module 270 may be coupled to the wireless communications module 260 through the PCM bus interface.

In some embodiments, the audio module 270 may alternatively transmit an audio signal to the wireless communications module 260 through the PCM interface to implement a function of answering calls by using a Bluetooth headset. Both the I2S interface and the PCM interface may be used for audio communication.

In some embodiments, the UART interface is a type of universal serial data bus used for asynchronous communication. The bus may be a bidirectional communications bus. The bus converts to-be-transmitted data between serial communication and parallel communication. The UART interface is usually configured to connect the processor 210 to the wireless communications module 260. For example, the processor 210 communicates with a Bluetooth module in the wireless communications module 260 through the UART interface to implement a Bluetooth function. In some embodiments, the audio module 270 may transmit an audio signal to the wireless communications module 260 through the UART interface to implement a function of playing music by using a Bluetooth headset.

In some embodiments, the MIPI may be configured to connect the processor 210 to peripheral components such as the display screen 294 and the camera 293. The MIPI includes a camera serial interface (camera serial interface, CSI), a display serial interface (display serial interface, DSI), and the like. The processor 210 communicates with the camera 293 through the CSI to implement a shooting function of the electronic device 200. The processor 210 communicates with the display screen 294 through the DSI to implement a display function of the electronic device 200.

In some embodiments, the GPIO interface may be configured by using software. The GPIO interface may be configured as a control signal, or may be configured as a data signal. The GPIO interface may be configured to connect the processor 210 to the camera 293, the display screen 294, the wireless communications module 260, the audio module 270, the sensor module 280, and the like. The GPIO interface may be alternatively configured as an I2C interface, an I2S interface, a UART interface, or an MIPI.

For example, the USB interface 230 is an interface compliant with USB standards and specifications, and may be specifically a mini USB interface, a micro USB interface, a USB type C interface, or the like. The USB interface 130 may be configured to connect to the charger to charge the electronic device 200, and may also be configured to transmit data between the electronic device 200 and a peripheral device. The USB interface 130 may also be configured to connect to a headset, to play audio by using the headset. The interface may be further configured to connect to another electronic device such as an AR device.

It may be understood that an interface connection relationship between the modules shown in this embodiment of this application is merely a schematic description, and does not constitute a limitation on a structure of the electronic device 200. In some other embodiments of this application, the electronic device 200 may use an interface connection manner different from that in the foregoing embodiments or a combination of a plurality of interface connection manners.

The charging management module 240 is configured to receive charging input from the charger. The charger may be a wireless charger, or may be a wired charger. In some embodiments of wired charging, the charging management module 240 may receive charging input of a wired charger through the USB interface 230. In some embodiments of wireless charging, the charging management module 240 may receive wireless charging input by using a wireless charging coil of the electronic device 200. While charging the battery 242, the charging management module 240 may further supply power to the electronic device by using the power management module 241.

The power management module 241 is configured to connect to the battery 242, the charging management module 240, and the processor 210. The power management module 241 receives input of the battery 242 and/or the charging management module 240, and supplies power to the processor 210, the internal memory 221, an external memory, the display screen 294, the camera 293, the wireless communications module 260, and the like. The power management module 241 may be further configured to monitor parameters such as a battery capacity, a battery cycle count, and a battery health status (leakage or impedance). In some other embodiments, the power management module 241 may also be disposed in the processor 210. In some other embodiments, the power management module 241 and the charging management module 240 may be alternatively disposed in a same component.

A wireless communications function of the electronic device 200 may be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 may be configured to cover one or more communications bands. Different antennas may be further multiplexed to improve antenna utilization. For example, the antenna 1 may be multiplexed into a diversity antenna of a wireless local area network. In some other embodiments, the antenna may be used in combination with a tuning switch.

The mobile communications module 250 may provide a wireless communications solution applied to the electronic device 200, for example, at least one of the following solutions: a 2nd generation (2nd generation, 2G) mobile communications solution, a 3rd generation (3rd generation, 3G) mobile communications solution, a 4th generation (4th generation, 4G) mobile communications solution, and a 5th generation (5th generation, 5G) mobile communications solution. The mobile communications module 250 may include at least one filter, switch, power amplifier, low noise amplifier (low noise amplifier, LNA), and the like. The mobile communications module 250 may receive an electromagnetic wave by using the antenna 1, perform processing such as filtering and amplification on the received electromagnetic wave, and send a processed electromagnetic wave to the modem processor for demodulation. The mobile communications module 250 may further amplify a signal modulated by the modem processor, and convert the signal into an electromagnetic wave for radiation by using the antenna 1. In some embodiments, at least some function modules of the mobile communications module 250 may be disposed in the processor 210. In some embodiments, at least some function modules of the mobile communications module 250 and at least some modules of the processor 210 may be disposed in a same component.

The modem processor may include a modulator and a demodulator. The modulator is configured to modulate a to-be-sent low-frequency baseband signal into a medium-frequency or high-frequency signal. The demodulator is configured to demodulate a received electromagnetic wave signal into a low-frequency baseband signal. The demodulator then transmits the demodulated low-frequency baseband signal to the baseband processor for processing. After being processed by the baseband processor, the low-frequency baseband signal is transmitted to the application processor. The application processor outputs a sound signal by using an audio device (not limited to the loudspeaker 270A, the receiver 270B, or the like), or displays an image or a video by using the display screen 294. In some embodiments, the modem processor may be an independent component. In some other embodiments, the modem processor may be independent of the processor 210 and be disposed in a same component as the mobile communications module 250 or another function module.

The wireless communications module 260 may provide a solution that is applied to the electronic device 200 and that includes wireless communication, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communications module 260 may be one or more components into which at least one communications processing module is integrated. The wireless communications module 260 receives an electromagnetic wave by using the antenna 2, performs frequency modulation and filtering processing on the electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation by using the antenna 2.

In some embodiments, the antenna 1 of the electronic device 200 is coupled to the mobile communications module 250, and the antenna 2 is coupled to the wireless communications module 260, so that the electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS), and/or a satellite based augmentation systems (satellite based augmentation systems, SBAS).

The electronic device 200 implements the display function by using the GPU, the display screen 294, the application processor, and the like. The GPU is a microprocessor for image processing, and connects the display screen 294 and the application processor. The GPU is configured to perform mathematical and geometric calculation for graphics rendering. The processor 210 may include one or more GPUs that execute program instructions to generate or change display information.

The display screen 294 is configured to display an image, a video, and the like. The display screen 294 includes a display panel. The display panel may use a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini-LED, micro-LED, a micro-OLED, a quantum dot light-emitting diode (quantum dot light-emitting diodes, QLED), or the like. In some embodiments, the electronic device 200 may include one or N display screens 294, and N is a positive integer greater than 1.

The electronic device 200 may implement the shooting function by using the ISP, the camera 293, the video codec, the GPU, the display screen 294, the application processor, and the like.

The ISP is configured to process data fed back by the camera 293. For example, during photographing, a shutter is opened, light is transmitted to a photosensitive element of the camera by using a lens, an optical signal is converted into an electrical signal, and the photosensitive element of the camera transmits the electrical signal to the ISP for processing, to convert the electrical signal into a visible image. The ISP may further perform algorithm optimization on noise, brightness, and a complexion of the image. The ISP may further optimize parameters such as exposure and a color temperature of a photographed scene. In some embodiments, the ISP may be disposed in the camera 293.

The camera 293 is configured to capture a still image or a video. An optical image of an object is generated by using the lens, and the optical image is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to be converted into a digital image signal. The ISP outputs the digital image signal to the DSP for processing. The DSP converts the digital image signal into an image signal in a standard format such as RGB or YUV. In some embodiments, the electronic device 200 may include one or N cameras 293, and N is a positive integer greater than 1.

The digital signal processor is configured to process a digital signal. In addition to processing a digital image signal, the digital signal processor may process another digital signal. For example, when the electronic device 200 performs frequency selection, the digital signal processor is configured to perform a Fourier transform or the like on frequency energy.

The video codec is configured to compress or decompress a digital video. The electronic device 200 can support one or more types of video codecs. In this way, the electronic device 200 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. By referring to a biological neural-network structure, for example, by referring to a transfer mode between human brain neurons, the NPU quickly processes input information, and can further continuously perform self-learning. Application such as intelligent recognition of the electronic device 200, for example, image recognition, face recognition, speech recognition, and text understanding, can be implemented by using the NPU.

The external memory interface 220 may be configured to connect to an external storage card such as a secure digital (secure digital, SD) card, to implement extension of a storage capability of the electronic device 200. The external storage card communicates with the processor 210 by using the external memory interface 220 to implement a data storage function. For example, a file such as music or a video is stored in the external storage card.

The internal memory 221 may be configured to store computer executable program code, and the executable program code includes instructions. The processor 210 executes various functional applications of the electronic device 200 and data processing by running the instructions stored in the internal memory 221. The internal memory 221 may include a program storage area and a data storage area. The program storage area may store an operating system, an application required by at least one function (for example, a sound play function or an image play function), and the like. The data storage area may store data (such as audio data or a phone book) created in use of the electronic device 200. In addition, the internal memory 221 may include a high-speed random access memory, and may further include a nonvolatile memory, for example, at least one magnetic disk storage component, a flash memory component, or universal flash storage (universal flash storage, UFS).

The electronic device 200 may implement an audio function such as music playing or recording by using the audio module 270, the loudspeaker 270A, the receiver 270B, the microphone 270C, the headset jack 270D, the application processor, and the like.

The audio module 270 is configured to convert a digital audio signal into an analog audio signal for output, and is also configured to convert analog audio input into a digital audio signal. The audio module 270 may be further configured to encode and decode audio signals. In some embodiments, the audio module 270 may be disposed in the processor 210, or some function modules of the audio module 270 may be disposed in the processor 210.

The loudspeaker 270A, also referred to as a "speaker", is configured to convert an electrical signal of audio into a sound signal. The electronic device 200 may be used to listen to music or answer a hands-free call by using the loudspeaker 270A.

The receiver 270B, also referred to as an "earpiece", is configured to convert an electrical signal of audio into a sound signal. When the electronic device 200 is used to answer a call or listen to a voice message, the receiver 270B may be placed near a human ear to listen to the voice.

The microphone 270C, also referred to as a "mouthpiece" and a "mic", is configured to convert a sound signal into an electrical signal. When making a call or sending a voice message, a user may produce a sound by making his or her mouth close to the microphone 270C, to input a sound signal into the microphone 270C. At least one microphone 270C may be disposed in the electronic device 200. In some other embodiments, two microphones 270C may be disposed in the electronic device 200, to implement a noise reduction function in addition to collecting a sound signal. In some other embodiments, three, four, or more microphones 270C may be alternatively disposed in the electronic device 200, to collect a sound signal, reduce noise, and identify a voice source to implement a directional recording function, and the like.

The headset jack 270D is configured to connect to a wired headset. The headset jack 270D may be the USB interface 230, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 280A is configured to sense a pressure signal, and may convert the pressure signal into an electrical signal. In some embodiments, the pressure sensor 280A may be disposed in the display screen 294. There are various types of pressure sensors 280A, for example, a resistive pressure sensor, an inductive pressure sensor, and a capacitive pressure sensor. The capacitive pressure sensor may include at least two parallel plates with conducting materials. Capacitance between electrodes changes when a force acts on the pressure sensor 280A. The electronic device 200 determines strength of the pressure based on a change of the capacitance. When a touch operation is performed on the display screen 294, the electronic device 200 detects strength of the touch operation by using the pressure sensor 280A. The electronic device 200 may also calculate a touch position based on a detected signal of the pressure sensor 280A. In some embodiments, touch operations that are performed on a same touch position but have different touch operation strength may correspond to different operation instructions. For example, when a touch operation whose touch operation strength is less than a first pressure threshold is performed on a messaging application icon, an instruction for viewing a short message service message is executed; or when a touch operation whose touch operation strength is greater than or equal to a first pressure threshold is performed on a messaging application icon, an instruction for creating a new short message service message is executed.

The gyroscope sensor 280B may be configured to determine a moving posture of the electronic device 200. In some embodiments, angular velocities of the electronic device 200 on three axes (namely, x, y, and z axes) may be determined by using the gyroscope sensor 280B. The gyro sensor 280B may be used for photographing stabilization. For example, when a shutter is pressed, the gyroscope sensor 280B detects a jitter angle of the electronic device 200, and calculates, based on the angle, a distance that needs to be compensated for by a lens module, so that a lens offsets the jitter of the electronic device 200 through a reverse motion, thereby implementing stabilization. The gyroscope sensor 280B may be further used for navigation and a somatosensory game scenario.

The barometric pressure sensor 280C is configured to measure barometric pressure. In some embodiments, the electronic device 200 calculates an altitude by using a barometric pressure value measured by the barometric pressure sensor 280C to assist in positioning and navigation.

The magnetic sensor 280D includes a Hall sensor. The electronic device 200 may detect opening and closing of a flip case by using the magnetic sensor 280D. In some embodiments, when the electronic device 200 is a flip device, the electronic device 200 may detect opening or closing of a flip cover by using the magnetic sensor 280D. A feature such as automatic unlocking in a case of flipping open is set based on the detected open/closed state of the flip case or the flip cover.

The acceleration sensor 280E may detect an acceleration of the electronic device 200 in each direction (usually on three axes). The acceleration sensor 280E can detect a value and a direction of gravity when the electronic device 200 is still. The acceleration sensor 280E may be further configured to identify a posture of the electronic device, and is applied to applications such as screen switching between landscape and portrait modes and a pedometer.

The distance sensor 280F is configured to measure a distance. The electronic device 200 may measure a distance by using infrared or laser. In some embodiments, during scene photographing, the electronic device 200 may measure a distance by using the distance sensor 280F to implement fast focusing.

The optical proximity sensor 280G may include, for example, a light-emitting diode (light-emitting diode, LED) and an optical detector such as a photodiode. The light-emitting diode may be an infrared light-emitting diode. The electronic device 200 emits infrared light by using the light-emitting diode. The electronic device 200 detects reflected infrared light from a nearby object by using the photodiode. When sufficient reflected light is detected, the electronic device 200 may determine that an object exists near the electronic device 200; or when insufficient reflected light is detected, the electronic device 200 may determine that there is no object near the electronic device 200. The electronic device 200 may detect, by using the optical proximity sensor 280G, that a user holds the electronic device 200 near his or her ear during a call, so that a screen is automatically turned off to save power. The optical proximity sensor 280G may also be used for automatically unlocking and locking a screen in a flip case mode and a pocket mode.

The ambient light sensor 280L is configured to sense ambient light brightness. The electronic device 200 may adaptively adjust brightness of the display screen 294 based on the sensed ambient light brightness. The ambient light sensor 280L may also be configured to automatically adjust white balance during photographing. The ambient light sensor 280L may further cooperate with the optical proximity sensor 280G to detect whether the electronic device 200 is in a pocket to prevent an accidental touch.

The fingerprint sensor 280H is configured to collect a fingerprint. The electronic device 200 may implement fingerprint unlocking, application lock access, fingerprint photographing, and fingerprint-based call answering by using the collected fingerprint feature.

The temperature sensor 280J is configured to detect a temperature. In some embodiments, the electronic device 200 executes a temperature processing policy by using the temperature detected by the temperature sensor 280J. For example, when a temperature reported by the temperature sensor 280J exceeds a threshold, the electronic device 200 performs performance degradation on a processor located near the temperature sensor 280J, to reduce power consumption and implement thermal protection. In some other embodiments, when a temperature is less than another threshold, the electronic device 200 heats the battery 242 to prevent abnormal shutdown of the electronic device 200 due to the low temperature. In some other embodiments, when a temperature is less than still another threshold, the electronic device 200 boosts an output voltage of the battery 242 to prevent abnormal shutdown due to the low temperature.

The touch sensor 280K is also referred to as a "touch panel". The touch sensor 280K may be disposed in the display screen 294, and the touch sensor 280K and the display screen 294 constitute a touchscreen. The touch sensor 280K is configured to detect a touch operation on or near the touch sensor 280K. The touch sensor may transfer the detected touch operation to the application processor to determine a touch event type. Visual output related to the touch operation may be provided by using the display screen 294. In some other embodiments, the touch sensor 280K may be alternatively disposed on a surface of the electronic device 200, and is located at a position different from that of the display screen 294.

The bone conduction sensor 280M may obtain a vibration signal. In some embodiments, the bone conduction sensor 280M may obtain a vibration signal of a human acoustic part vibrating a bone part. The bone conduction sensor 280M may also be in contact with a human pulse to receive a blood pressure beat signal. In some embodiments, the bone conduction sensor 280M may also be disposed in the headset to form a bone conduction headset in combination with the headset. The audio module 270 may parse out a voice signal based on the vibration signal that is of the acoustic part vibrating the bone part and that is obtained by the bone conduction sensor 280M, to implement a voice function. The application processor may parse out heart rate information based on the blood pressure beat signal obtained by the bone conduction sensor 280M, to implement a heart rate detection function.

The key 290 includes a power-on key, a volume key, and the like. The key 290 may be a mechanical key, or may be a touch key. The electronic device 200 may receive key input to generate key signal input related to user setting and function control of the electronic device 200.

The motor 291 may generate a vibration prompt. The motor 291 may be used for an incoming call vibration prompt, and may also be used for touch vibration feedback. For example, touch operations performed on different applications (for example, photographing and audio playing) may correspond to different vibration feedback effects. The motor 291 may correspond to different vibration feedback effects when touch operations are performed on different areas of the display screen 294. Different application scenarios (for example, a time reminder, message receiving, an alarm clock, and a game) may also correspond to different vibration feedback effects. The touch vibration feedback effect may be further customized.

The indicator 292 may be an indicator lamp, may be configured to indicate a charging status and a power change, and may also be configured to indicate a message, a missed call, a notification, and the like.

The SIM card interface 295 is configured to connect to a SIM card. The SIM card may be inserted into the SIM card interface 295 to implement contact with the electronic device 200, or may be removed from the SIM card interface 295 to implement separation from the electronic device 200. The electronic device 200 may support one or N SIM card interfaces, and N is a positive integer greater than 1. A plurality of cards may be simultaneously inserted into a same SIM card interface 295, and the plurality of cards may be of a same type or different types. The SIM card interface 295 may also be compatible with an external storage card. The electronic device 200 interacts with a network by using the SIM card to implement functions such as calling and data communication. In some embodiments, the electronic device 200 uses an embedded SIM (embedded-SIM, eSIM) card. The eSIM card may be embedded in the electronic device 200, and cannot be separated from the electronic device 200.

The foregoing describes in detail a hardware system of the electronic device 200. The following describes a software system of the electronic device 200. The software system may use a layered architecture, an event-driven architecture, a microkernel architecture, a microservices architecture, or a cloud architecture. In this embodiment of this application, the layered architecture is used as an example to describe the software system of the electronic device 200.

Figure 3:
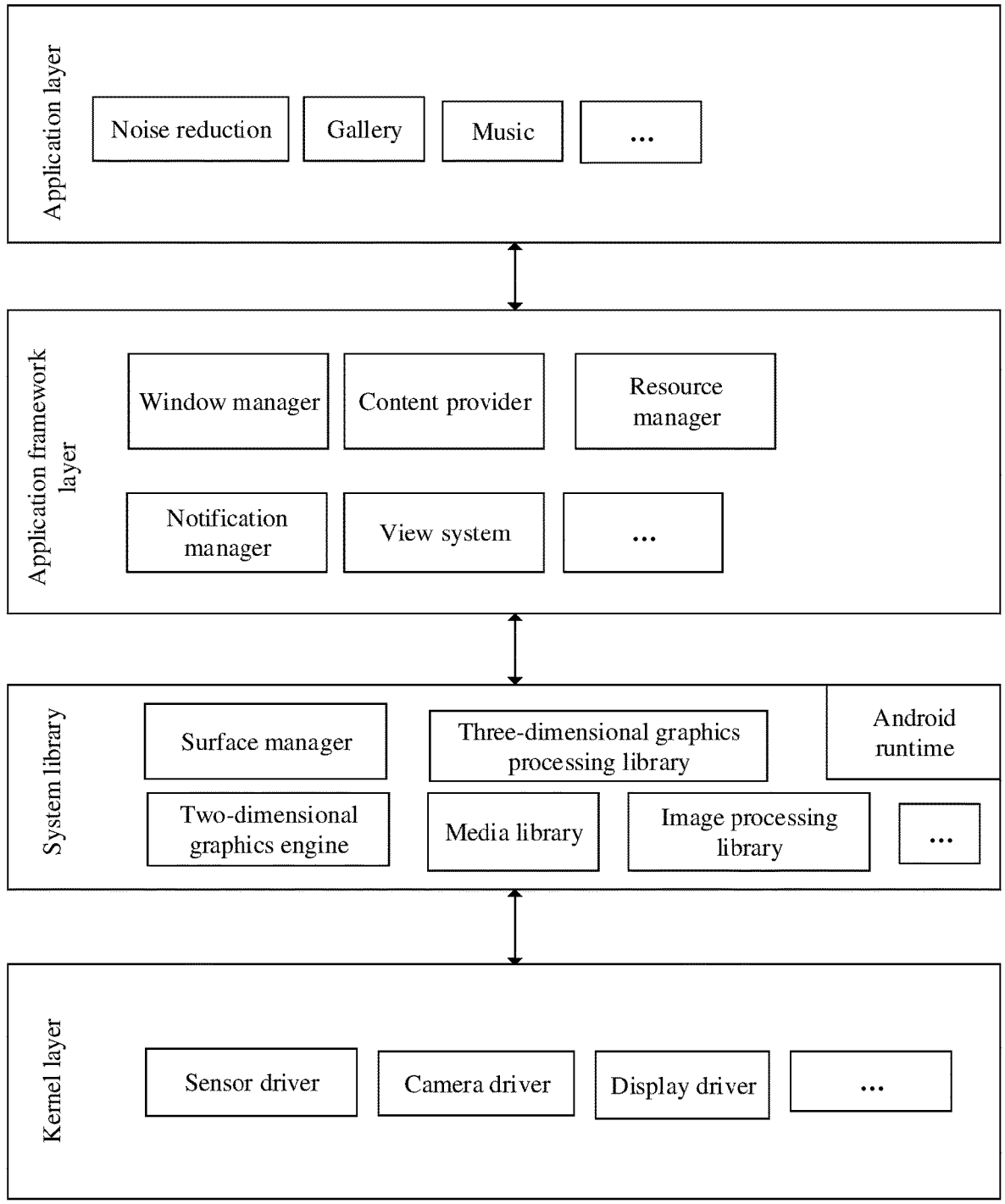
FIG. 3 is a schematic diagram of a software structure of an electronic device according to an embodiment of this application.

FIG. 3 is a block diagram of a software structure of an electronic device 200 according to an embodiment of this application. In the layered architecture, software is divided into several layers. Each layer has a clear role and function. Layers communicate with each other through a software interface. In some embodiments, an Android system is divided into four layers, and the four layers are an application layer, an application framework layer, Android runtime (Android runtime) and a system library, and a kernel layer from top to bottom. The application layer may include a series of application packages.

As shown in FIG. 3, the application packages may include an application (application, APP), for example, a noise reduction application, Camera, Gallery, and Music.

For example, the noise reduction app may be configured to enable the noise reduction method provided in embodiments of this application.

The application framework layer provides an application programming interface (application programming interface, API) and a programming framework for the application of the application layer. The application framework layer includes some predefined functions.

As shown in FIG. 3, the application framework layer may include a window manager, a content provider, a view system, a resource manager, a notification manager, and the like.

The window manager is configured to manage a window program. The window manager may obtain a display screen size, determine whether a status bar exists, to lock a screen, to capture a screen, and the like.

The content provider is configured to store and obtain data and make the data accessible to the application. The data may include videos, images, audio, calls that are made and answered, browsing histories and bookmarks, a phone book, and the like.

The view system includes a visual control, for example, a control for displaying text or a control for displaying pictures. The view system may be configured to build an application. The display interface may include one or more views. For example, a display interface including a notification icon may include a view for displaying text and a view for displaying a picture.

The resource manager provides various resources, for example, a localized string, an icon, a picture, a layout file, and a video file, for an application.

The notification manager enables an application to display notification information in a status bar, and may be configured to convey a notification message. The message may automatically disappear after a short stay without interacting with a user. For example, the notification manager is configured to notify download completion, remind a message, and the like. The notification manager may be alternatively a notification that is in a form of a chart or scroll bar text and that appears in a status bar at the top of a system, for example, a notification of an application running in the background, or may be a notification that is in a form of a dialog box and that appears on a screen. For example, text information is displayed in the status bar, a prompt tone is made, the electronic device vibrates, and the indicator lamp flashes.

The Android runtime includes a kernel library and a virtual machine. The Android runtime is responsible for scheduling and management of the Android system.

The kernel library includes two parts: a functional function that a Java language needs to call and a kernel library of Android.

The application layer and the application framework layer run in the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of audio formats, playback and recording of a plurality of video formats, and static image files. The media library may support a plurality of audio and video coding formats, for example, MPEG-4, H.264, moving picture experts group audio layer III (moving picture experts group audio layer III, MP3), advanced audio coding (advanced audio coding, AAC), adaptive multi-rate (adaptive multi-rate, AMR), joint photographic experts group (joint photographic experts group, JPG), and portable network graphics (portable network graphics, PNG). The three-dimensional graphics processing library is configured to implement three-dimensional graphics drawing, image rendering, composition, layer processing, and the like.

The 2D graphics engine is a drawing engine of 2D drawing. The kernel layer is a layer between hardware and software. The kernel layer includes at least a sensor driver, a camera driver, a display driver, and the like.

It should be noted that the foregoing uses FIG. 2 as an example to describe the diagram of the structure of the PC device, and uses FIG. 3 to describe the diagram of the software architecture of the PC device. This application sets no limitation thereto.

In embodiments of this application, noise reduction may be performed on the PC device in two manners. In Manner 1, noise reduction is performed in a phase manner (for example, a phase inverting manner). In Manner 2, noise reduction is performed through filtering. With reference to FIG. 4 to FIG. 8, the following describes in detail the noise reduction method provided in embodiments of this application.

Figure 4:
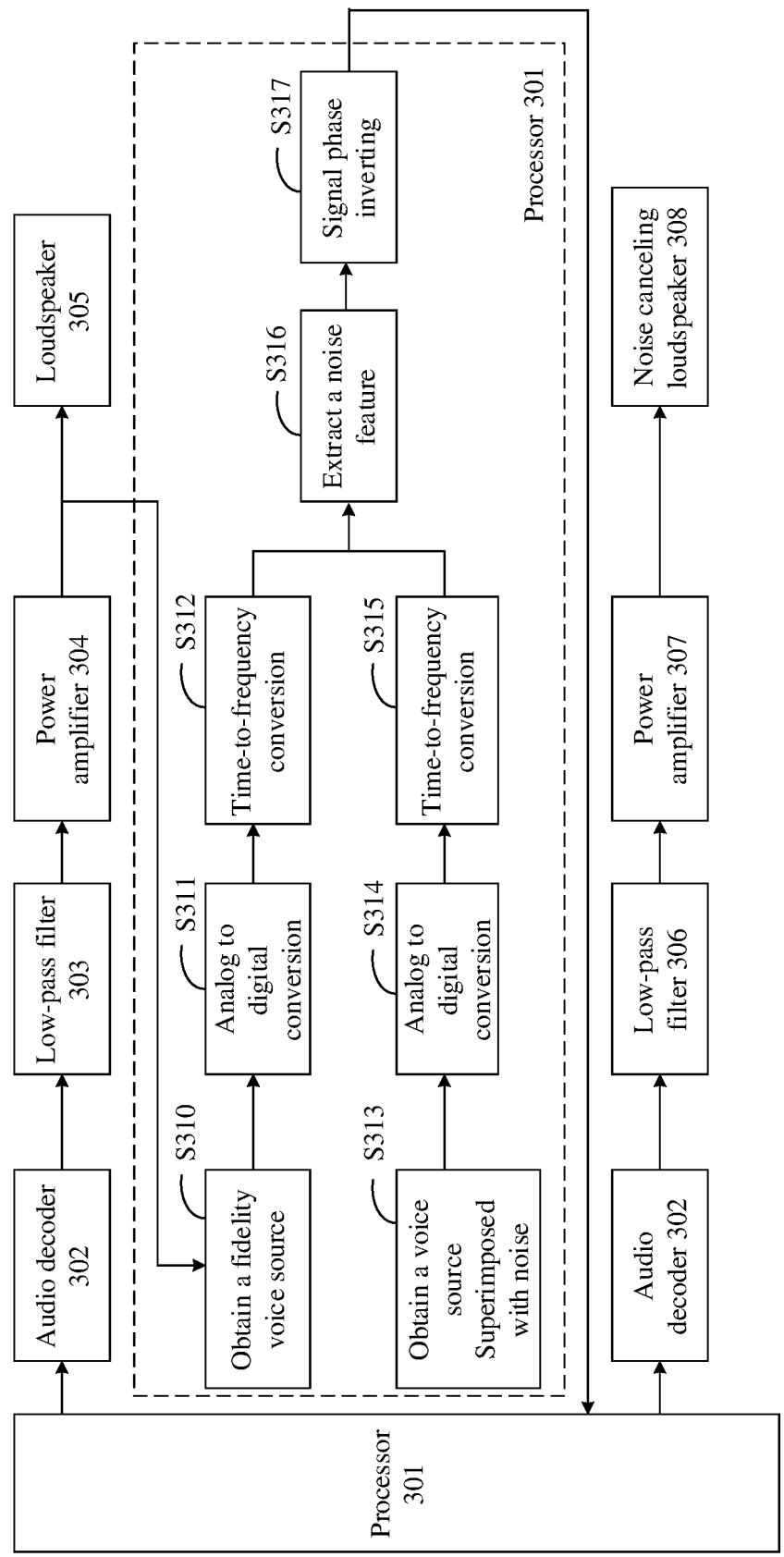
FIG. 4 is a schematic block diagram of a noise reduction method according to an embodiment of this application.

FIG. 4 is a schematic block diagram of a noise reduction method according to an embodiment of this application.

As shown in FIG. 4, as an operation and control core of a PC device, a processor 301 may be used as an execution unit for information processing and program running. An audio decoder 302 is configured to obtain an audio signal from the processor 301 and process the audio signal. A low-pass filter 303 is configured to perform low-pass filtering on the audio signal obtained by the audio decoder. A power amplifier 304 is configured to input an audio signal processed by the low-pass filter to the power amplifier for processing. A loudspeaker 305 is configured to play a voice source.

For example, the audio decoder 302 may convert a read digital audio signal into an analog audio signal for output, and decode a multi-channel audio signal encoded during recording.

In a possible implementation, the audio decoder 302 may further perform equalizer or third-party effect processing on the obtained original audio signal, so that the original audio signal has another music style.

For example, the original audio signal may be processed to obtain a jazz style audio signal.

For example, low-pass filtering performed by the low-pass filter (Low-pass filter) 303 is a filtering manner, and meets the following rule: A low-frequency signal can properly pass while a high-frequency signal that exceeds a specified threshold is blocked and weakened. However, amplitude of the blocking and weakening may be changed based on different frequencies and different filtering programs.

For example, the power amplifier (power amplifier) 304 is an amplifier that can generate maximum power output to drive a load (for example, a loudspeaker) under a given distortion rate condition. The power amplifier plays a pivot role of "organization and coordination" in a whole audio system, and determines, to some extent, whether the whole system can provide good audio output.

For example, the loudspeaker 305 may be configured to play a voice source corresponding to an audio signal that is processed by the power amplifier 304 and that is input into the loudspeaker.

The noise reduction method provided in this embodiment of this application is performed in the processor 301 of the PC device. The noise reduction method may include steps S310 to S317. The following separately describes these steps in detail.

It should be understood that in the schematic block diagram of the noise reduction method shown in FIG. 4, a phase manner, namely, a phase inverting manner, is used, to offset noise generated by keyboard resonance of the PC device, so that noise reduction can be implemented.

Step S310: Obtain a fidelity voice source (an example of a first voice source).

For example, the fidelity voice source may be obtained by using a digital signal processor in the power amplifier. The fidelity voice source may be in a pulse code modulation (Pulse Code Modulation, PCM) format or windows media audio (Windows Media Audio, WAV) format. A file in the WAV format is essentially a sound for which a sound effect is added and that has not been played by the loudspeaker.

For example, after obtaining the fidelity voice source, the digital signal processor in the power amplifier may send the fidelity voice source to the processor 301.

In a possible implementation, the fidelity voice source may be an original audio signal, namely, an audio signal that does not undergo third-party effect processing.

In a possible implementation, the fidelity voice source may be an original audio signal, namely, an audio signal that does not undergo third-party effect processing.

For example, the original audio signal may be an obtained unplayed audio signal, for example, an audio signal corresponding to an unplayed video or audio file that is obtained from a server or locally stored.

In a possible implementation, the fidelity voice source may be an audio signal obtained after third-party effect processing is performed on an original audio signal, for example, a jazz style audio signal, a rock style audio signal, or an audio signal of another style.

For example, when a user does not like a style of an original video file or a style of an original audio file, the original video file or the original audio file may be processed by using sound effect adjustment software or an applet or in another manner to obtain a processed audio file. For example, an audio signal corresponding to an unplayed original video or audio file is obtained from a server, and tuning processing is performed on the audio signal to obtain a processed audio signal.

It should be understood that, in this embodiment of this application, the fidelity voice source is an audio signal corresponding to an unplayed video or audio file that is obtained by a terminal device. The fidelity voice source may be an original voice source, or the fidelity voice source may be a voice source obtained after effect processing is performed on an original voice source.

Step S311: Perform analog to digital conversion on the fidelity voice source.

For example, the analog to digital conversion is a process of converting an analog signal corresponding to the fidelity voice source into a digital signal.

Step S312: Perform time-to-frequency conversion processing.

It should be understood that the time-to-frequency conversion processing may be converting a time domain signal into a frequency domain signal through a Fourier transform. The time-to-frequency conversion processing may also be referred to as time-to-frequency transformation.

For example, after time-to-frequency conversion processing is performed on the digital signal corresponding to the fidelity voice source, a frequency response line graph (an example of a first frequency response line graph) corresponding to the fidelity voice source is obtained.

Step S313: Obtain a voice source (an example of a second voice source) superimposed with noise.

It should be understood that the voice source superimposed with noise may include the fidelity voice source and a noise feature (an example of a noise signal).

For example, the voice source superimposed with noise may be obtained by using an apparatus that is embedded in a keyboard for sensing mechanical vibration or a microphone (Microphone, MIC) apparatus.

For example, the noise may be keyboard resonance noise, and a voice source superimposed with the keyboard resonance noise may be obtained.

For example, the noise may be keyboard resonance noise and ambient noise, and a voice source superimposed with the keyboard resonance noise and the ambient noise may be obtained.

Step S314: Perform analog to digital conversion on the voice source superimposed with noise.

For example, the analog to digital conversion is a process of converting an analog signal corresponding to the voice source superimposed with noise into a digital signal.

Step S315: Perform time-to-frequency conversion processing.

For example, after time-to-frequency conversion processing is performed on the digital signal corresponding to the voice source superimposed with noise, a frequency response line graph (an example of a second frequency response line graph) corresponding to the voice source superimposed with noise is obtained.

Step S316: Extract the noise feature.

For example, the noise feature may be obtained by comparing the voice source superimposed with noise with the fidelity voice source. The noise feature may also be referred to as a noise signal.

For example, the noise feature may be obtained based on the frequency response line graph corresponding to the voice source superimposed with noise and the frequency response line graph corresponding to the fidelity voice source.

For example, the frequency response line graph (an example of the second frequency response line graph) corresponding to the voice source superimposed with noise is compared with the frequency response line graph (an example of the first frequency response line graph) corresponding to the fidelity voice source within a frequency range of a human ear hearing range 20 Hz to 20 kHz. The hearing range may be a frequency range that can be heard by a human ear.

For example, the frequency response line graph corresponding to the voice source superimposed with noise is compared with the frequency response line graph corresponding to the fidelity voice source within an effective or a high-risk frequency range 100 Hz to 1 kHz. The effective or high-risk frequency range may be a frequency range within which a human ear is sensitive to a voice source.

For example, the noise feature may be determine by traversing the frequency response line graph corresponding to the voice source superimposed with noise and the frequency response line graph corresponding to the fidelity voice source at each frequency position within the frequency range of the human ear hearing range or within the effective or high-risk frequency range of 100 Hz to 1 kHz.

Step S317: Perform signal phase inverting processing on the noise feature to obtain an audio noise signal with same amplitude, a same frequency, and a different phase.

For example, the obtained noise feature is processed to achieve same amplitude and an opposite phase.

It should be understood that the forgoing step S310 to step S317 may be performed in the processor 301.

The processor 301 is further configured to obtain the audio signal in step S317, and input the audio signal into the audio decoder 302, a low-pass filter 306, and a power amplifier 307 for processing. A noise canceling loudspeaker 308 is configured to play a noise reduction voice source, and the noise reduction voice source is used to offset noise included in a voice source played by the loudspeaker 305.

The low-pass filter 306 is a filter different from the low-pass filter 303. The power amplifier 304 is different from the power amplifier 307.

For example, one or more noise canceling loudspeakers 308 may be configured below the keyboard, and the one or more noise canceling loudspeakers 308 are configured to offset noise generated by the voice source played by the loudspeaker 305.

For example, one noise canceling loudspeaker 308 may be configured below the keyboard, and the noise canceling loudspeaker is configured to offset noise generated by the voice source played by the loudspeaker.

For example, a plurality of noise canceling loudspeakers 308 may be installed below the keyboard, and the plurality of noise canceling loudspeakers 308 may perform averaging processing to offset noise generated by the voice source played by the loudspeaker 305.

For example, weights of the plurality of noise canceling loudspeakers may be determined based on different installation positions and/or noise offset effects of installation positions.

For example, the foregoing noise may include the keyboard resonance noise, or may further include the ambient noise.

Figure 5:
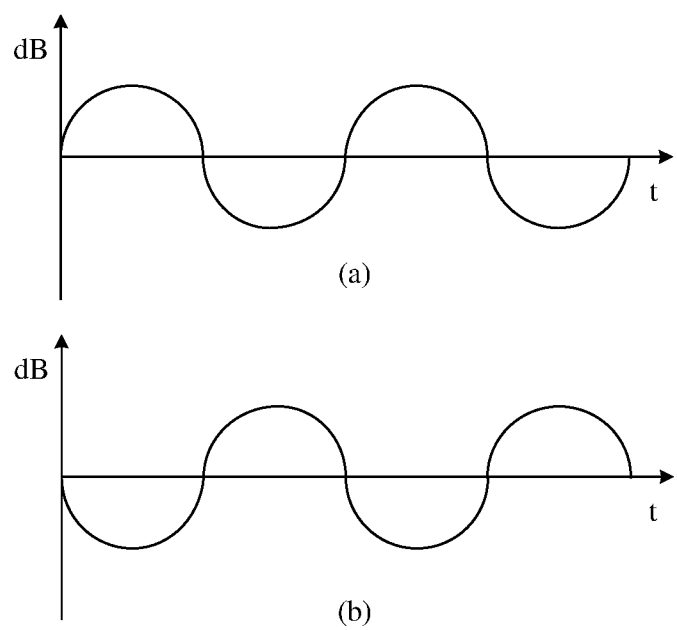
FIG. 5 is a schematic diagram of phase inverting processing of noise according to an embodiment of this application.

FIG. 5 is a schematic diagram of phase inverting processing of noise according to an embodiment of this application. (a) in FIG. 5 is a schematic diagram of a voice source superimposed with noise. (b) in FIG. 5 is a schematic diagram of a noise feature. Performing noise reduction in a phase manner may be essentially that the noise canceling loudspeaker plays a voice source corresponding to a phase opposite to that of noise to offset the noise in the voice source superimposed with noise, to implement noise reduction.

For example, it may be specified on the PC device by default that a process of the foregoing noise reduction processing can be automatically triggered after the PC device is powered on.

For example, a noise reduction application may be installed in the PC device. When a user needs to perform noise reduction processing, the user may click the noise reduction app to trigger the foregoing process of noise reduction processing.

Figure 8:
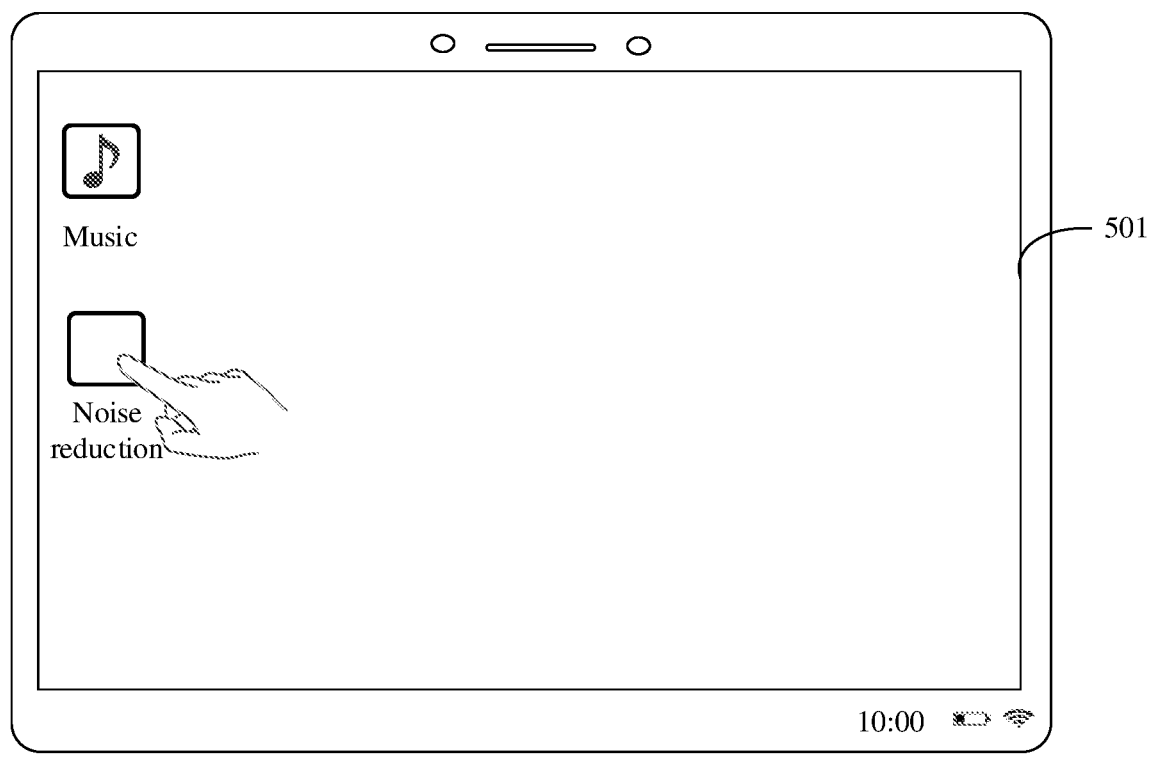
FIG. 8 is a schematic diagram of an interface of a noise reduction method according to an embodiment of this application.

For example, as shown in FIG. 8, a screen display system of the PC device displays currently output interface content 501. The interface content 501 may be a home screen of the PC device. The interface content 501 displays a plurality of applications (application, App), for example, a noise reduction application, Gallery, and Music. It should be understood that the interface content 501 may further include more other applications. This is not limited in this application.

It should be understood that the noise reduction application can trigger the noise reduction method provided in this embodiment of this application.

In a possible implementation, as shown in FIG. 8, a user may click the noise reduction application, and in response to the clicking operation of the user, the PC device enables the noise reduction application and triggers the processor to start to execute instructions corresponding to the noise reduction method.

In a possible implementation, a user may enable the noise reduction application by using a voice function, so that the PC device triggers the processor to start to execute instructions corresponding to the noise reduction method.

In this embodiment of this application, the fidelity voice source and the voice source superimposed with noise are obtained and compared to extract the noise feature in the voice source superimposed with noise. The noise feature can be further offset in the phase manner, so that noise reduction processing is implemented and user experience is improved.

Figure 6:
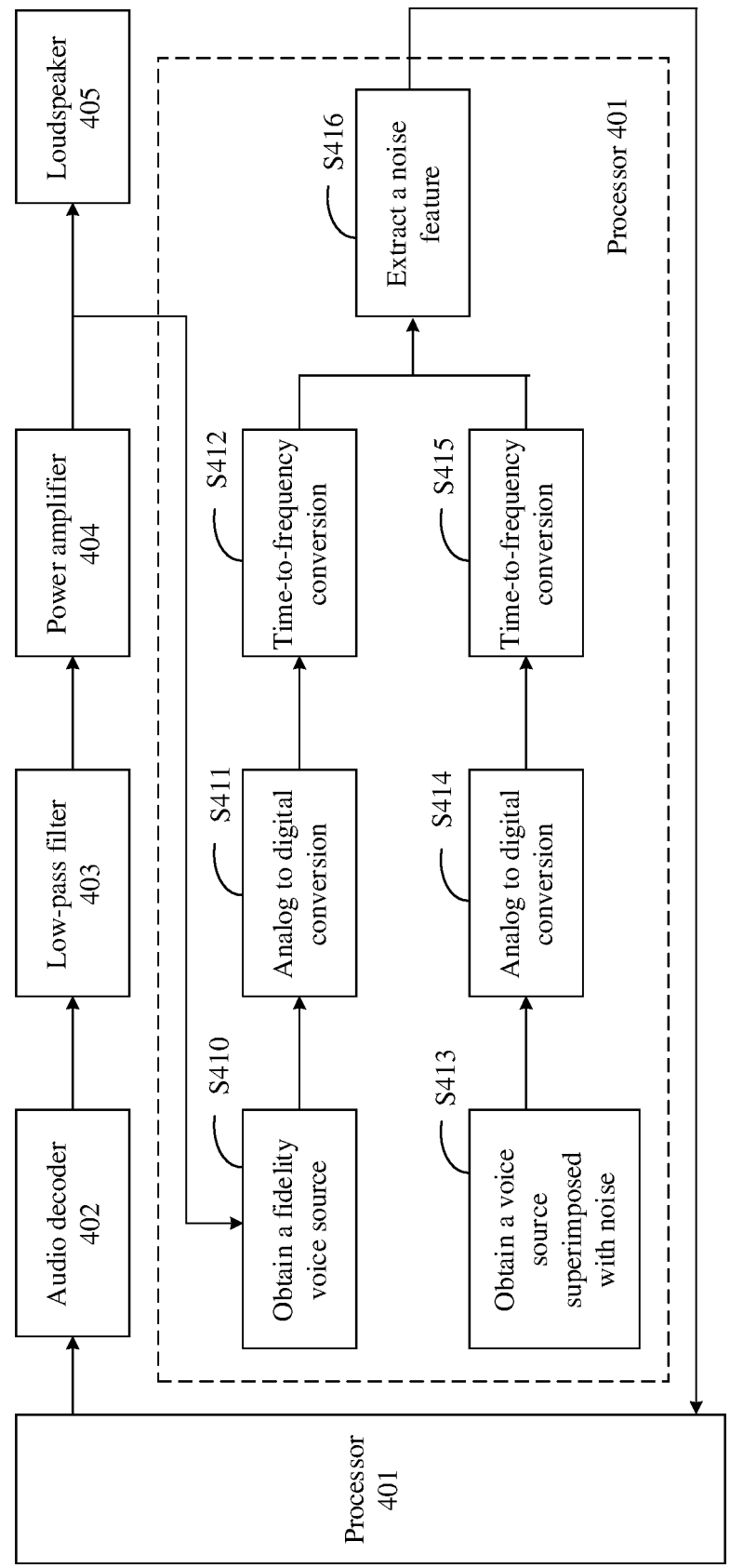
FIG. 6 is a schematic block diagram of a noise reduction method according to an embodiment of this application.

FIG. 6 is a schematic block diagram of a noise reduction method according to an embodiment of this application.

As shown in FIG. 6, as an operation and control core of a PC device, a processor 401 is used as an execution unit for information processing and program running. An audio decoder 402 is configured to obtain an audio signal from the processor 401 and process the audio signal. A low-pass filter 403 is configured to perform low-pass filtering on the audio signal obtained by the audio decoder. A power amplifier 404 is configured to input an audio signal processed by the low-pass filter to the power amplifier for processing. A loudspeaker 405 is configured to play a voice source.

For example, the audio decoder 402 may convert a read digital audio signal into an analog audio signal for output, and decode a multi-channel audio signal encoded during recording.

In a possible implementation, the audio decoder 402 may further perform equalizer or third-party effect processing on the obtained original audio signal, so that the original audio signal has another music style.

For example, the original audio signal may be processed to obtain a jazz style audio signal.

For example, low-pass filtering performed by the low-pass filter (Low-pass filter) 403 is a filtering manner, and meets the following rule: A low-frequency signal can properly pass while a high-frequency signal that exceeds a specified threshold is blocked and weakened. However, amplitude of the blocking and weakening may be changed based on different frequencies and different filtering programs.

For example, the power amplifier (power amplifier) 404 is an amplifier that can generate maximum power output to drive a load (for example, a loudspeaker) under a given distortion rate condition. The power amplifier plays a pivot role of "organization and coordination" in a whole audio system, and determines, to some extent, whether the whole system can provide good audio output.

For example, the loudspeaker 405 may be configured to play a voice source corresponding to an audio signal that is processed by the power amplifier 404 and that is input into the loudspeaker.

The noise reduction method provided in this embodiment of this application is performed in the processor 401 of the PC device. The noise reduction method may include steps S410 to S416. The following separately describes these steps in detail.

It should be understood that in the schematic block diagram of the noise reduction method shown in FIG. 6, noise reduction is implemented through filtering.

Step S410: Obtain a fidelity voice source (an example of a first voice source).

For example, the fidelity voice source may be obtained by using a digital signal processor. The fidelity voice source may be in a PCM format or a WAV format. A file in the WAV format is essentially a sound for which a sound effect is added and that has not been played by the loudspeaker.

The digital signal processor may be a digital signal processor in the power amplifier 404.

In a possible implementation, the fidelity voice source may be an original audio signal, namely, an audio signal that does not undergo third-party effect processing.

For example, the original audio signal may be an obtained unplayed audio signal, for example, an audio signal corresponding to an unplayed video or audio file that is obtained from a server or locally stored.

In a possible implementation, the fidelity voice source may be an audio signal obtained after third-party effect processing is performed on an original audio signal, for example, a jazz style audio signal, a rock style audio signal, or an audio signal of another style.

For example, when a user does not like a style of an original video file or a style of an original audio file, the original video file or the original audio file may be processed by using sound effect adjustment software or an applet or in another manner to obtain a processed audio file. For example, an audio signal corresponding to an unplayed original video or audio file is obtained from a server, and tuning processing is performed on the audio signal to obtain a processed audio signal.

It should be understood that, in this embodiment of this application, the fidelity voice source is an audio signal corresponding to an unplayed video or audio file that is obtained by a terminal device. The fidelity voice source may be an original voice source, or the fidelity voice source may be a voice source obtained after effect processing is performed on an original voice source.

It should be understood that the obtained fidelity voice source is an audio signal output after processing by the power amplifier.

Step S411: Perform analog to digital conversion on the fidelity voice source.

For example, the analog to digital conversion is a process of converting an analog signal corresponding to the fidelity voice source into a digital signal.

Step S412: Perform time-to-frequency conversion processing.

It should be understood that the time-to-frequency conversion processing may be converting a time domain signal into a frequency domain signal through a Fourier transform. The time-to-frequency conversion processing may also be referred to as time-to-frequency transformation.

For example, after time-to-frequency conversion processing is performed on the digital signal corresponding to the fidelity voice source, a frequency response line graph (an example of a first frequency response line graph) corresponding to the fidelity voice source is obtained.

Step S413: Obtain a voice source (an example of a second voice source) superimposed with noise.

It should be understood that the voice source superimposed with noise may include the fidelity voice source and a noise feature.

For example, the voice source superimposed with noise may be obtained by using an apparatus that is embedded in a keyboard for sensing mechanical vibration or a microphone (MIC) apparatus.

For example, the noise may be keyboard resonance noise, and a voice source superimposed with the keyboard resonance noise may be obtained.

For example, the noise may be keyboard resonance noise and ambient noise, and a voice source superimposed with the keyboard resonance noise and the ambient noise may be obtained.

Step S414: Perform analog to digital conversion on the voice source superimposed with noise.

For example, the analog to digital conversion is a process of converting an analog signal corresponding to the voice source superimposed with noise into a digital signal.

Step S415: Perform time-to-frequency conversion processing.

For example, after time-to-frequency conversion processing is performed on the digital signal corresponding to the voice source superimposed with noise, a frequency response line graph (an example of a second frequency response line graph) corresponding to the voice source superimposed with noise is obtained.

Step S416: Extract the noise feature (an example of a noise signal).

For example, the noise feature may be obtained by comparing the voice source superimposed with noise with the fidelity voice source.

For example, the noise feature may be obtained based on the frequency response line graph corresponding to the voice source superimposed with noise and the frequency response line graph corresponding to the fidelity voice source.

For example, the frequency response line graph corresponding to the voice source superimposed with noise is compared with the frequency response line graph corresponding to the fidelity voice source within a frequency range of a hearing range 20 Hz to 20 kHz. The hearing range may be a frequency range that can be heard by a human ear.

For example, the frequency response line graph corresponding to the voice source superimposed with noise is compared with the frequency response line graph corresponding to the fidelity voice source within an effective or a high-risk frequency range 100 Hz to 1 kHz. The effective or high-risk frequency range may be a frequency range within which a human ear is sensitive to a voice source.

For example, the noise feature may be determine by traversing the frequency response line graph corresponding to the voice source superimposed with noise and the frequency response line graph corresponding to the fidelity voice source at each frequency position within the frequency range of the human ear hearing range or within the effective or high-risk frequency range of 100 Hz to 1 kHz.

It should be understood that the forgoing step S410 to step S416 may be performed in the processor 401. The processor 401 is further configured to obtain the noise feature, and filtering processing is performed on the obtained noise feature in the audio decoder 402, so that after processing by the low-pass filter 403 and the power amplifier 404, a voice source played by the loudspeaker 405 is a voice source that undergoes the noise reduction processing.

Figure 7:
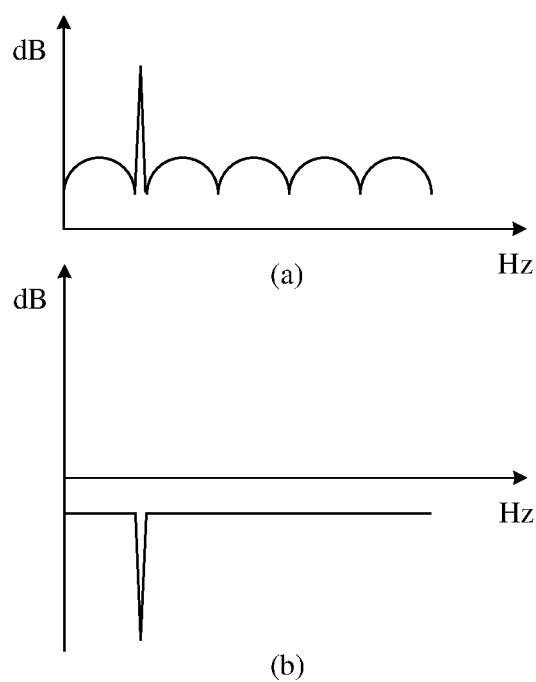
FIG. 7 is a schematic diagram of filtering processing according to an embodiment of this application.

For example, FIG. 7 is a schematic diagram of filtering processing according to an embodiment of this application. (a) in FIG. 7 is a schematic diagram of a voice source superimposed with noise. (b) in FIG. 7 is a schematic diagram of a noise feature. Performing noise reduction through filtering may be essentially performing filtering by adding a digital filter of a corresponding frequency (for example, 500 Hz and 800 Hz), in other words, adding frequencies and amplitude, to implement noise reduction.

It should be further understood that, in the solutions of this application, noise reduction is performed through filtering without a need to install another noise canceling loudspeaker below a keyboard of the PC device.

In a possible implementation, it may be specified on the PC device that a process of the foregoing noise reduction processing can be automatically triggered by default after the PC device is powered on.

In a possible implementation, a noise reduction application may be installed in the PC device. When a user needs to perform noise reduction processing, the user may click the noise reduction app to trigger the foregoing process of noise reduction processing.

For example, as shown in FIG. 8, a screen display system of the PC device displays currently output interface content 501. The interface content 501 may be a home screen of the PC device. The interface content 501 displays a plurality of applications (application, App), for example, a noise reduction application, Gallery, and Music. It should be understood that the interface content 501 may further include more other applications. This is not limited in this application.

It should be understood that the noise reduction application can trigger the noise reduction method provided in this embodiment of this application.

In a possible implementation, as shown in FIG. 8, a user may click the noise reduction application, and in response to the clicking operation of the user, the PC device enables the noise reduction application and triggers the processor to start to execute instructions corresponding to the noise reduction method.

In a possible implementation, a user may enable the noise reduction application by using a voice function, so that the PC device triggers the processor to start to execute instructions corresponding to the noise reduction method.

In this embodiment of this application, the fidelity voice source and the voice source superimposed with noise are obtained and compared to extract the noise feature in the voice source superimposed with noise. The noise feature can be further offset through filtering, so that noise reduction processing is implemented and user experience is improved.

The foregoing describes in detail the noise reduction methods provided in embodiments of this application with reference to FIG. 1 to FIG. 8. The following describes in detail apparatus embodiments of this application with reference to FIG. 9 and FIG. 10. It should be understood that a noise reduction apparatus in embodiments of this application may perform the noise reduction methods in the foregoing embodiments of this application. In other words, for specific working processes of the following products, refer to corresponding processes in the foregoing method embodiments.

Figure 9:
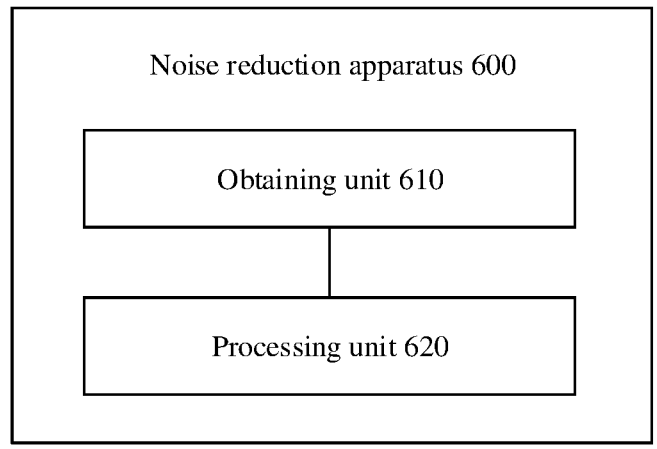
FIG. 9 is a schematic diagram of a noise reduction apparatus according to this application.

FIG. 9 is a schematic block diagram of a noise reduction apparatus according to this application.

It should be understood that a noise reduction apparatus 600 may perform the noise reduction method shown in FIG. 4 to FIG. 8. The noise reduction apparatus 600 includes an obtaining unit 610 and a processing unit 620. It should be further understood that the noise reduction apparatus 600 may be an integrated terminal device.

For example, the obtaining unit 610 is configured to obtain a first voice source and a second voice source, where the first voice source is a fidelity voice source, the second voice source is an audio signal that includes the first voice source and a noise signal, and the noise signal comes from noise generated by vibration of a keyboard of the noise reduction apparatus, and/or the noise signal comes from noise of an environment in which the noise reduction apparatus is located. The processing unit 620 is configured to determine the noise signal based on the first voice source and the second voice source, and perform noise reduction processing on the second voice source based on the noise signal, to obtain a voice source that undergoes the noise reduction processing.

Optionally, in an embodiment, the processing unit 620 is specifically configured to:

perform time-to-frequency conversion processing on the first voice source to obtain a first frequency response line graph;

perform time-to-frequency conversion processing on the second voice source to obtain a second frequency response line graph; and determine the noise signal based on the first frequency response line graph and the second frequency response line graph.

Optionally, in an embodiment, the processing unit 620 is specifically configured to:

compare the first frequency response line graph with the second frequency response line graph within a frequency range of a human ear hearing range to determine the noise signal.

Optionally, in an embodiment, the processing unit 620 is specifically configured to:

perform noise reduction processing on the second voice source in a phase inverting manner based on the noise signal.

Optionally, in an embodiment, the processing unit 620 is specifically configured to perform noise reduction processing on the second voice source through filtering based on the noise signal.

Optionally, in an embodiment, the processing unit 620 is further configured to:

configure at least one noise canceling loudspeaker below the keyboard, where the at least one noise canceling loudspeaker is configured to play a noise reduction voice source, and the noise reduction voice source is an audio signal obtained after phase inverting processing is performed on the noise signal.

Optionally, in an embodiment, a weight of any one of the at least one noise canceling loudspeaker is determined based on an installation position.

Optionally, in an embodiment, the noise signal includes a resonance signal generated by the keyboard and the loudspeaker.

For example, the processing unit 620 is configured to display a display interface of the noise reduction apparatus 600. The obtaining unit 610 is configured to receive a first operation of a user on the display interface. The processing unit 620 is configured to respond to the first operation, so that the noise reduction apparatus 600 performs the following steps: obtaining a first voice source and a second voice source, where the first voice source is a fidelity voice source, the second voice source is an audio signal that includes the first voice source and a noise signal, and the noise signal comes from noise generated by the keyboard of the noise reduction apparatus, and/or the noise signal comes from noise of an environment in which the noise reduction apparatus is located; obtaining the noise signal based on the first voice source and the second voice source; and performing noise reduction processing on the second voice source based on the noise signal, to determine a voice source that undergoes the noise reduction processing.

Optionally, in an embodiment, the first operation is an operation of clicking a noise reduction application.

Optionally, in an embodiment, the first operation is an operation of configuring the noise reduction method to be enabled once the integrated terminal device is powered on.

It should be noted that the noise reduction apparatus 600 is embodied in a form of a functional unit. The term "unit" herein may be implemented in a form of software and/or hardware. This is not specifically limited.

For example, the "unit" may be a software program, a hardware circuit, or a combination of both the software program and the hardware circuit for implementing the foregoing functions. The hardware circuit may include an application specific integrated circuit (application specific integrated circuit, ASIC), an electronic circuit, a processor configured to execute one or more software or firmware programs (for example, a shared processor, a dedicated processor, or a group processor), a memory, a combinational logic circuit, and/or another suitable component that supports the described functions.

Therefore, the units in examples described in this embodiment of this application can be implemented by using electronic hardware or a combination of computer software and electronic hardware. Whether these functions are implemented in hardware or software depends on specific applications and design constraints of the technical solutions. A person skilled in the art may use different methods to implement the described functions for specific applications, but it should not be considered that the implementation goes beyond the scope of this application.

Figure 10:
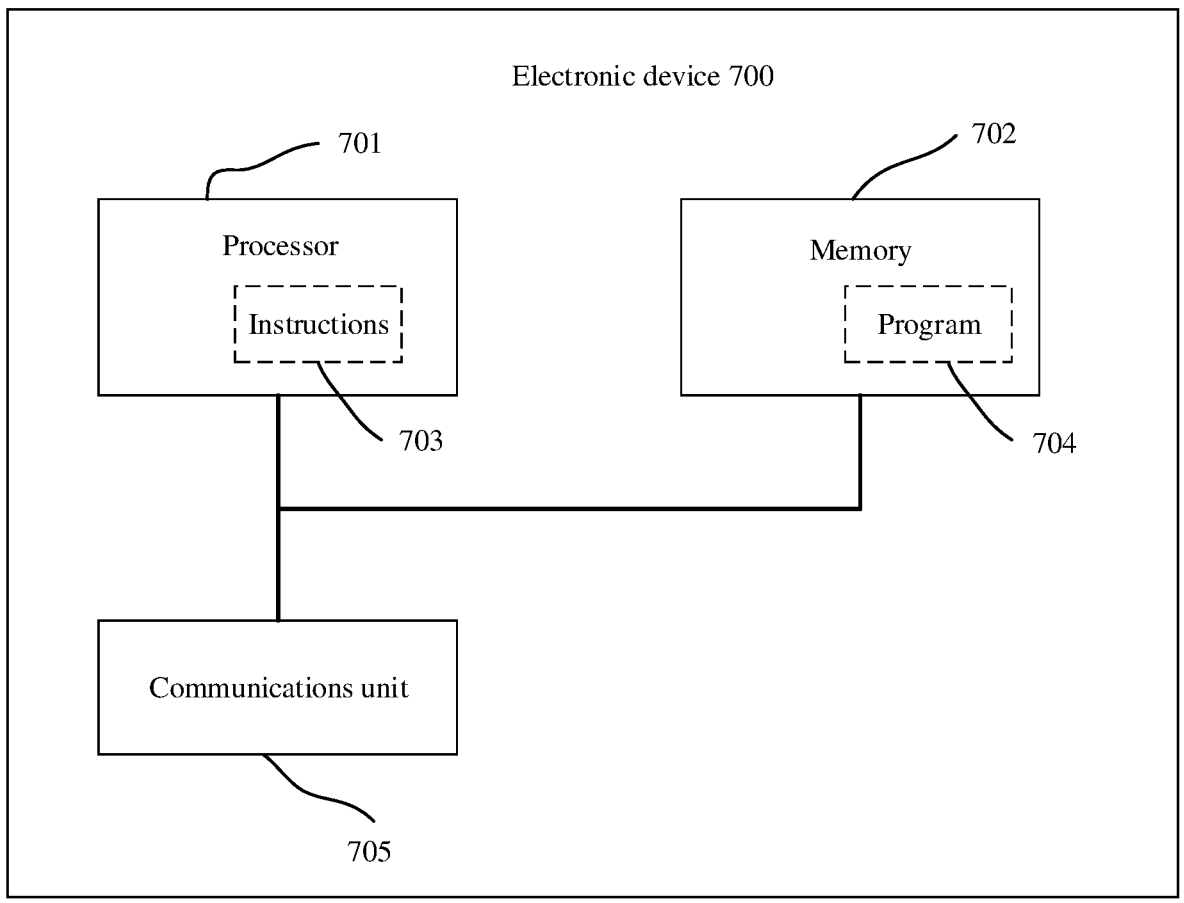
FIG. 10 is a schematic diagram of an electronic device performing noise reduction processing according to this application.

FIG. 10 is a schematic diagram of a structure of an electronic device according to this application. A dashed line in FIG. 10 indicates that the unit or the module is optional. An electronic device 700 may be configured to implement the noise reduction methods described in the foregoing method embodiments.

The electronic device 700 includes one or more processors 701, and the one or more processors 701 can support the electronic device 700 in implementing the noise reduction methods described in the method embodiments. The processor 701 may be a general-purpose processor or a dedicated processor. For example, the processor 701 may be a central processing unit (central processing unit, CPU), a digital signal processor (digital signal processor, DSP), an application specific integrated circuit (application specific integrated circuit, ASIC), a field programmable gate array (field programmable gate array, FPGA), or another programmable logic device such as a discrete gate, a transistor logic device, or a discrete hardware component.

The processor 701 may be configured to control the electronic device 700, execute a software program, and process data of the software program. The electronic device 700 may further include a communications unit 705, and the communications unit 705 is configured to implement input (receiving) and output (sending) of a signal.

For example, the electronic device 700 may be a chip, the communications unit 705 may be an input circuit and/or an output circuit of the chip, or the communications unit 705 may be a communications interface of the chip, and the chip may be used as a part of a terminal device or another electronic device.

For another example, the electronic device 700 may be the terminal device, and the communications unit 705 may be a transceiver of the terminal device, or the communications unit 705 may be a transceiver circuit of the terminal device.

The electronic device 700 may include one or more memories 702. A program 704 is stored in the memory 702. The program 704 may be run by the processor 701 to generate instructions 703, so that the processor 701 executes the noise reduction methods described in the foregoing method embodiments based on the instructions 703.

Optionally, the memory 702 may further store data. Optionally, the processor 701 may further read the data stored in the memory 702. The data may be stored in a same storage address as the program 704, or the data may be stored in a different storage address from the program 704.

The processor 701 and the memory 702 may be disposed separately, or may be integrated together. For example, the processor 701 and the memory 702 are integrated in a system on chip (system on chip, SOC) of the terminal device.

For example, the memory 702 may be configured to store the related program 704 of the noise reduction methods provided in embodiments of this application, and the processor 701 may be configured to invoke, when performing noise reduction processing on the integrated terminal device, the related program 704 of the noise reduction method stored in the memory 702 to perform the noise reduction method in embodiments of this application. For example, the method includes: obtaining a first voice source and a second voice source, where the first voice source is a fidelity voice source, the second voice source is an audio signal that includes the first voice source and a noise signal, and the noise signal comes from noise generated by vibration of a keyboard of the noise reduction apparatus, and/or the noise signal comes from noise of an environment in which the noise reduction apparatus is located; determining the noise signal based on the first voice source and the second voice source; and performing noise reduction processing on the second voice source based on the noise signal, to obtain a voice source that undergoes the noise reduction processing. For example, the method includes: displaying a display interface of an integrated terminal device, receiving a first operation of a user on the display interface, and responding to the first operation, so that the integrated terminal device performs the following steps: obtaining a first voice source and a second voice source, where the first voice source is a fidelity voice source, the second voice source is an audio signal that includes the first voice source and a noise signal, and the noise signal comes from noise generated by a keyboard of the integrated terminal device, and/or the noise signal comes from noise of an environment in which the integrated terminal device is located; obtaining the noise signal based on the first voice source and the second voice source; and performing noise reduction processing on the second voice source based on the noise signal, to determine a voice source that undergoes the noise reduction processing.

This application further provides a computer program product. When the computer program product is executed by a processor 701, the noise reduction method in any one of the method embodiments of this application is implemented.

The computer program product may be stored in a memory 702, and may be, for example, a program 704. Processing processes such as preprocessing, compilation, assembling, and linking are performed on the program 704, so that the program 704 is finally converted into an executable object file that can be executed by the processor 701.

This application further provides a computer readable storage medium. The computer readable storage medium stores a computer program, and when the computer program is executed by a computer, the noise reduction method in any one of the method embodiments of this application is implemented. The computer program may be an advanced language program, or may be an executable object program.

The computer readable storage medium is, for example, a memory 702. The memory 702 may be a volatile memory or a non-volatile memory, or the memory 702 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and the random access memory is used as an external cache. By way of examples instead of limitation, RAMs in various forms are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In this application, "at least one" means one or more, and "a plurality of" means two or more. "at least one of the following" or a similar expression thereof indicates any combination of these items, including a single item or any combination of a plurality of items. For example, at least one of a, b, or c may indicate a, b, c, a and b, a and c, b and c, or a, b, and c, where a, b, and c may be singular or plural.

It should be understood that in various embodiments of this application, sequence numbers of the foregoing processes do not mean a sequence of execution. The execution sequence of the processes should be determined based on functions and internal logic of the processes, and should not constitute any limitation on an implementation process of embodiments of this application.

A person of ordinary skill in the art may recognize that, with reference to the examples described in the embodiments disclosed herein, units and algorithm steps may be implemented by electronic hardware or a combination of computer software and electronic hardware. Whether these functions are implemented in hardware or software depends on specific applications and design constraints of the technical solutions. A person skilled in the art may use different methods to implement the described functions for specific applications, but it should not be considered that the implementation goes beyond the scope of this application.

It may be clearly understood by a person skilled in the art that, for convenience and brevity of description, for specific working processes of the foregoing described system, apparatus, and unit, refer to corresponding processes in the foregoing method embodiments, and details are not described herein again.

In the several embodiments provided in this application, it should be understood that the disclosed apparatus and method may be implemented in other manners. For example, the foregoing described apparatus embodiment is merely an example. For example, the unit division is merely logical function division, and there may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms The units described as separate parts may or may not be physically separate, and parts displayed as units may or may not be physical units, and may be located in one position, or may be distributed on a plurality of network units. Some or all of the units may be selected based on an actual requirement to implement the objectives of the solutions in the embodiments.

In addition, functional units in embodiments of this application may be integrated into one processing unit, or each unit may exist separately physically, or two or more units may be integrated into one unit.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A noise reduction method, wherein the noise reduction method is applied to a keyboard of an integrated terminal device and comprises:
   obtaining a first voice source and a second voice source, wherein the first voice source is a fidelity voice source, the second voice source is an audio signal that comprises the first voice source and a noise signal, and the noise signal comes from noise generated by vibration of the keyboard, and/or the noise signal comes from noise of an environment in which the integrated terminal device is located;
   determining the noise signal based on the first voice source and the second voice source; and
   performing noise reduction processing on the second voice source based on the noise signal, to obtain a voice source that undergoes the noise reduction processing.

2. The noise reduction method according to claim 1, wherein the determining the noise signal based on the first voice source and the second voice source comprises:
   performing time-to-frequency conversion processing on the first voice source to obtain a first frequency response line graph;
   performing time-to-frequency conversion processing on the second voice source to obtain a second frequency response line graph; and
   determining the noise signal based on the first frequency response line graph and the second frequency response line graph.

3. The noise reduction method according to claim 2, wherein the determining the noise signal based on the first frequency response line graph and the second frequency response line graph comprises:
   comparing the first frequency response line graph with the second frequency response line graph within a frequency range of a human ear hearing range to determine the noise signal.

4. The noise reduction method according to claim 1, wherein the performing noise reduction processing on the second voice source based on the noise signal comprises:
   performing noise reduction processing on the second voice source in a phase inverting manner based on the noise signal.

5. The noise reduction method according to claim 4, further comprising:
   configuring at least one noise canceling loudspeaker below the keyboard, wherein the at least one noise canceling loudspeaker is configured to play a noise reduction voice source, and the noise reduction voice source is an audio signal obtained after phase inverting processing is performed on the noise signal.

6. The noise reduction method according to claim 5, wherein a weight of any one of the at least one noise canceling loudspeaker is determined based on an installation position.

7. The noise reduction method according to claim 5, wherein the noise signal comprises a resonance signal generated by the keyboard and the loudspeaker.

8. The noise reduction method according to claim 1, wherein the performing noise reduction processing on the second voice source based on the noise signal comprises:
   performing noise reduction processing on the second voice source through filtering based on the noise signal.

9. A noise reduction apparatus, wherein the noise reduction apparatus comprises a processor and a memory, the memory is configured to store a computer program, and the processor is configured to invoke the computer program from the memory and run the computer program, so that the noise reduction apparatus performs the noise reduction method according to claim 1.

10. A chip, comprising a processor, wherein when the processor executes instructions, the processor performs the noise reduction method according to claim 1.

11. A non-transitory computer readable storage medium, wherein the non-transitory computer readable storage medium stores a computer program, and when the computer program is executed by a processor, the processor performs the noise reduction method according to-claim 1.

12. A noise reduction method, wherein the noise reduction method is applied to a keyboard of an integrated terminal device and comprises:
   obtaining a first voice source and a second voice source, wherein the first voice source is a fidelity voice source, the second voice source is an audio signal that comprises the first voice source and a noise signal, the noise signal comes from noise generated by vibration of the keyboard, and/or the noise signal comes from noise of an environment in which the integrated terminal device is located, the fidelity voice source is an unplayed audio signal output by a power amplifier of the integrated terminal device, and the noise signal comprises a resonance signal generated by the keyboard and a loudspeaker;
   determining the noise signal based on the first voice source and the second voice source; and
   performing noise reduction processing on the second voice source based on the noise signal, to obtain a voice source that undergoes the noise reduction processing; and
   the performing noise reduction processing on the second voice source based on the noise signal comprises:
   performing noise reduction processing on the second voice source through filtering based on the noise signal; and
   playing, by the loudspeaker of the integrated terminal device, the voice source that undergoes the noise reduction processing.

13. The noise reduction method according to claim 12, wherein the determining the noise signal based on the first voice source and the second voice source comprises:
   performing time-to-frequency conversion processing on the first voice source to obtain a first frequency response line graph;
   performing time-to-frequency conversion processing on the second voice source to obtain a second frequency response line graph; and
   determining the noise signal based on the first frequency response line graph and the second frequency response line graph.

14. The noise reduction method according to claim 13, wherein the determining the noise signal based on the first frequency response line graph and the second frequency response line graph comprises:
  comparing the first frequency response line graph with the second frequency response line graph within a frequency range of a human ear hearing range to determine the noise signal.

15. A noise reduction method, comprising:
  displaying a display interface of an integrated terminal device;
  receiving a first operation of a user on the display interface; and
  responding to the first operation, so that the integrated terminal device performs operations comprising:
  obtaining a first voice source and a second voice source, wherein the first voice source is a fidelity voice source, the second voice source is an audio signal that comprises the first voice source and a noise signal, the noise signal comes from noise generated by a keyboard of the integrated terminal device, and/or the noise signal comes from noise of an environment in which the integrated terminal device is located, the fidelity voice source is an unplayed audio signal output by a power amplifier of the integrated terminal device, and the noise signal comprises a resonance signal generated by the keyboard and a loudspeaker;
  obtaining the noise signal based on the first voice source and the second voice source; and
  performing noise reduction processing on the second voice source based on the noise signal, to determine a voice source that undergoes the noise reduction processing; and
  the performing noise reduction processing on the second voice source based on the noise signal comprises:
  performing noise reduction processing on the second voice source through filtering based on the noise signal; and
  playing, by the loudspeaker of the integrated terminal device, the voice source that undergoes the noise reduction processing.

* * * * *

UNITED STATES PATENT AND TRADEMARK OFFICE
CERTIFICATE OF CORRECTION

| | | |
|---|---|---|
| PATENT NO. | : 12,223,939 B2 | Page 1 of 1 |
| APPLICATION NO. | : 18/025671 | |
| DATED | : February 11, 2025 | |
| INVENTOR(S) | : Ruchen Wang | |

It is certified that error appears in the above-identified patent and that said Letters Patent is hereby corrected as shown below:

On the Title Page

Change "(71) Applicant: HONOR DEVICE CO., LTD., Guangdong (CN)" to be --(71) Applicant: HONOR DEVICE CO., LTD., Shenzhen (CN)--; and In the Specification Column 5, Line 39, Change "'I'" to --"/"--.

Signed and Sealed this
Eleventh Day of March, 2025

Coke Morgan Stewart
*Acting Director of the United States Patent and Trademark Office*